Dec. 30, 1930.   E. P. BURRELL   1,786,699
APPARATUS FOR CUTTING MATERIALS
Filed Feb. 8, 1926   3 Sheets-Sheet 1

INVENTOR
Edward P. Burrell
BY
Richey & Watts
ATTORNEYS

Dec. 30, 1930.  E. P. BURRELL  1,786,699
APPARATUS FOR CUTTING MATERIALS
Filed Feb. 8, 1926  3 Sheets-Sheet 2

INVENTOR
Edward P. Burrell
BY
Richey & Watts
ATTORNEYS

Patented Dec. 30, 1930

1,786,699

UNITED STATES PATENT OFFICE

EDWARD PARKER BURRELL, OF CLEVELAND, OHIO, ASSIGNOR, BY MESNE ASSIGNMENTS, TO THE GUARDIAN TRUST COMPANY, OF CLEVELAND, OHIO, A CORPORATION OF OHIO

APPARATUS FOR CUTTING MATERIALS

Application filed February 8, 1926. Serial No. 86,771.

This invention relates to the art of transmitting power and is particularly concerned with the construction of apparatus including drum and cutter shaft actuating means, for use in cutting machines of the type disclosed in the application of George R. Napier, Serial No. 31,423, filed May 19, 1925.

The method of cutting as disclosed in that application may be described briefly as comprising a method in which the materials to be cut are subjected to centrifugal force, preferably in a vertical plane, and wherein they are cut by cutting means which preferably are caused to operate on the material after the feeding operation has been substantially completed, the cutting means extending radially into, but not entirely through, all the material. It also includes a mixing of the materials being cut which takes place simultaneously with the cutting, as well as a thorough and complete mixing of the cut material either immediately after, or if desired, during the cutting operation. This method is particularly applicable to the preparation of food or similar materials where it is desired to cut the material to a certain fineness without crushing it or extracting or pressing out juices or liquids contained therein.

The apparatus as disclosed in that application may be described briefly as comprising a rotatable container which will retain material to be cut and in which the material may be subjected to centrifugal force, preferably in a substantially vertical plane. Means are provided for rotating the container and also for actuating cutting means which operatively engage with and cut the material in the container without, however, coming into actual contact with the inner surface of the container. Preferably a rotary cutting means consisting of one or more cutters and capable of movement toward or away from the inner surface of the container is employed. Liners of wood or similar materials for the container are unnecessary, since the cutters do not run against or contact with the container.

My present invention includes the means disclosed in the above mentioned application of George R. Napier and hereinafter disclosed and claimed for supporting and actuating the cutter shaft.

My invention will be described more fully hereinafter, reference being had to the drawings accompanying and forming a part of this specification in which.

Figure 3:
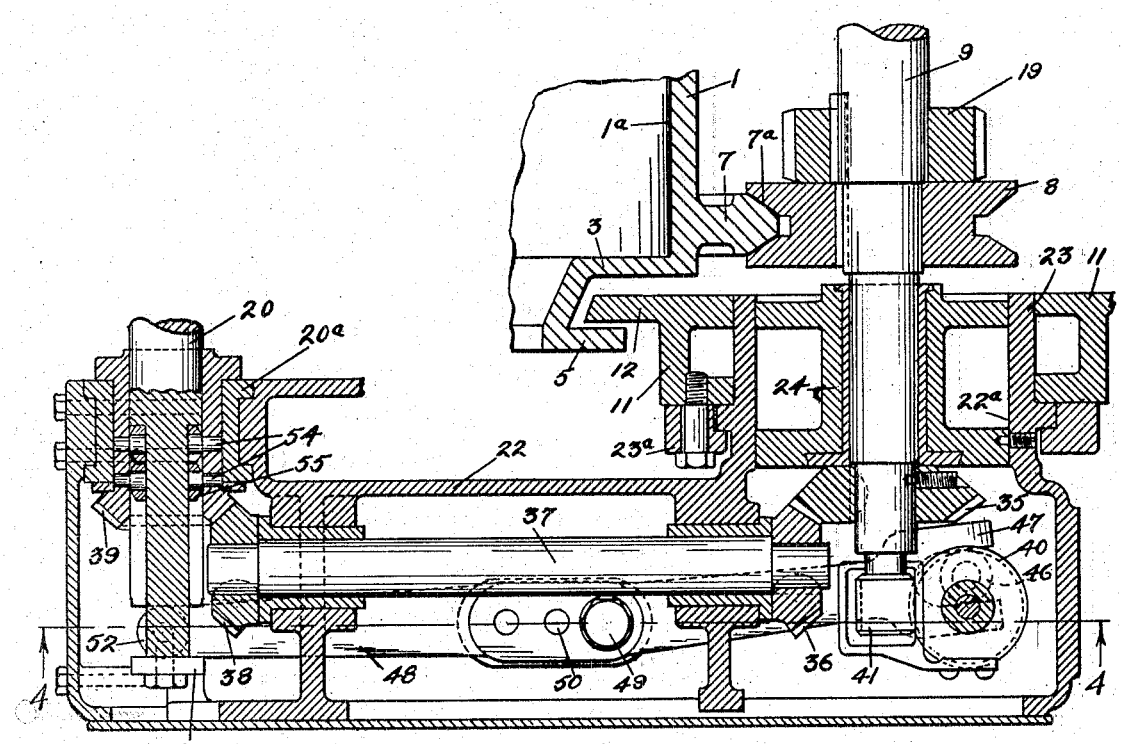
Fig. 3 is a vertical section of the cutter actuating means taken on line 3—3 of Fig. 1.
Figure 1:
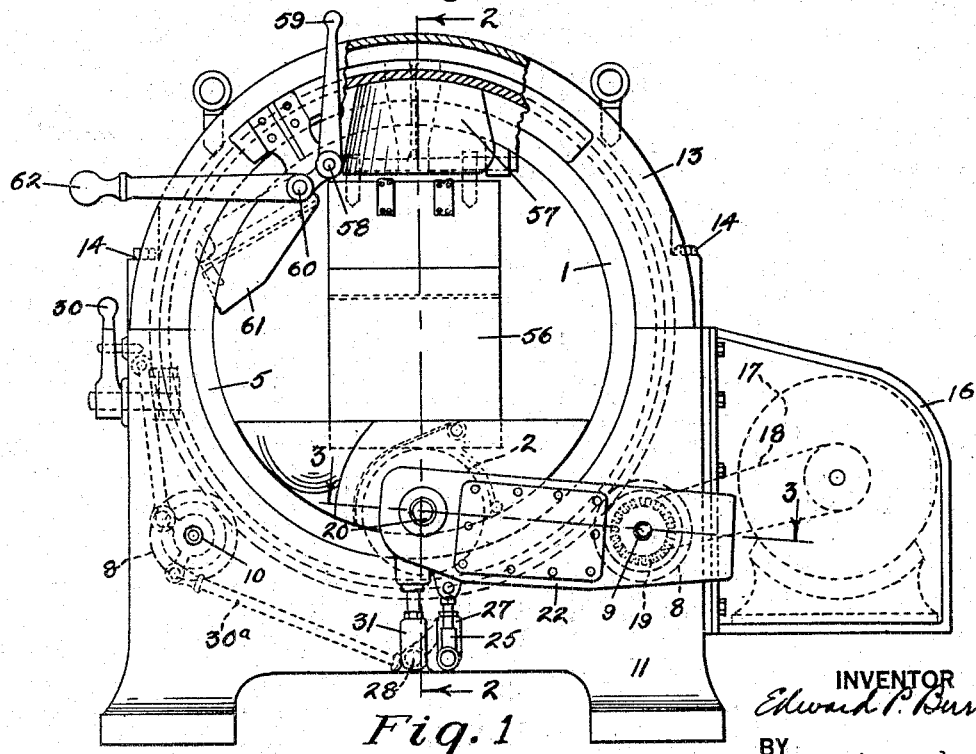
Fig. 1 is a right side elevation of one form of apparatus embodying my invention.
Figure 2:
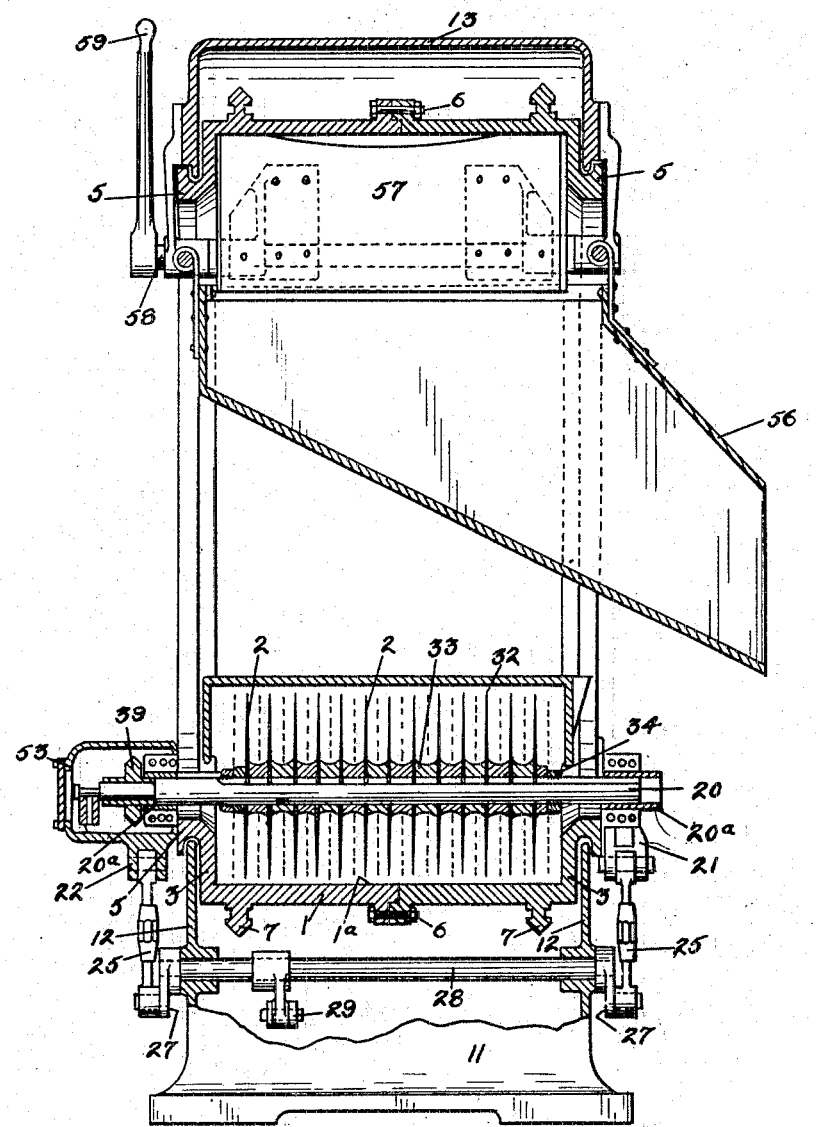
Fig. 2 is a vertical section taken substantially on line 2—2 of Fig. 1.
Figure 4:
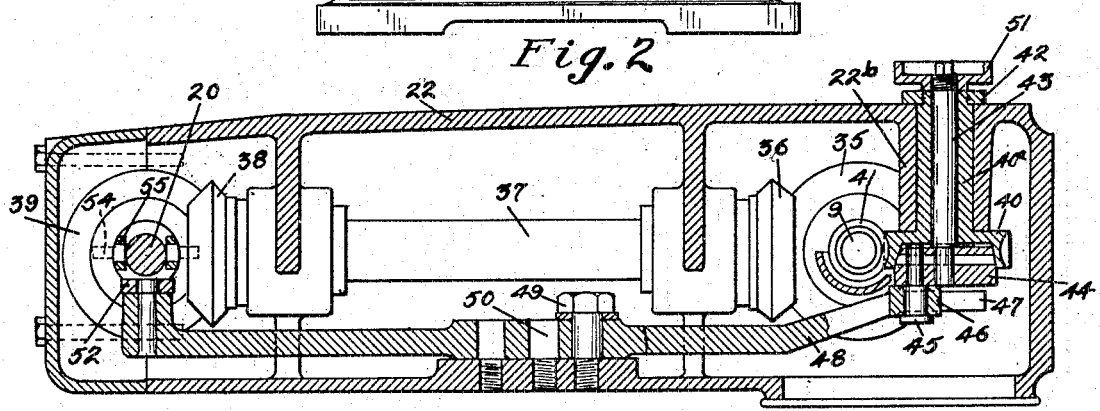
Fig. 4 is a horizontal section of the cutter actuating means taken on line 4—4 of Fig. 3.

The device shown in Figures 1 to 4 may be described as comprising a material retaining container or drum 1 which is mounted for rotation preferably in a vertical plane. Cutting means designated by the character 2 are provided within the container in position to cut material carried by the container. This cutting means is movable toward and away from the inner surface 1a of the container and may be withdrawn completely out of contact with the material carried by the container, but is at all times maintained out of substantial contact with and does not run against the inner surface 1a of the container 1. Preferably a space equal to the thickness of an ordinary sheet of paper is maintained between the cutting means and the inner surface of the container.

The material retaining container 1, as shown, consists of a circular drum having an inner surface 1a and a peripheral side flange 3 extending inwardly at each end and in the plane of the drum 1, which flanges are preferably continued in a direction generally transverse to the plane of rotation of the drum and are provided at their outer extremities with substantially parallel oppositely extending flange 5. This drum 1 may consist of a single element or part, or as shown, may be made up of two substantially circular cooperating sections secured together as by securing means 6. The drum is provided on its outer surface with annular tracks 7 which may have various cross sectional configurations but, as shown, have substantially wedge-shaped outer surfaces 7a to seat in correspondingly grooved rollers 8 on shafts 9 and 10 which extend substantially parallel to the axis of rotation of the drum and are each rotatably mounted in the drum support. The drum support may conveniently comprise a housing 11 for the drum, the marginal sides 12 of which are disposed between and are overlapped by the inwardly and outwardly extending flanges 3 and 5, respectively, of the drum. This housing 11 is preferably split horizontally at about the center of the drum so that the upper half 13 of the housing may be removed to expose the drum. Securing means 14 hold the two sections of the housing in assembled relation. Preferably the two shafts 9 and 10, each provided with supporting rollers 8, furnish the only support and driving means for the drum. To provide for slight inaccuracies in alignment of the annular tracks 7 certain of the rollers 8 are shiftable longitudinally on the shafts so that the rollers will engage at all times with the annular tracks 7 whether or not these tracks are exactly parallel.

Means for rotating the drum may be carried by the housing. As shown it consists of a motor 17 supported on one end of the lower portion of the housing 11 within a housing 16 and connected by a belt 18, chain, or other suitable means, with a pulley or gear 19 keyed to the shaft 9 which carries the drum. Power from the motor is transmitted through the driving means to the axle 9 and thence to the drum through the grooved rollers 8.

The cutting means illustrated comprises one or more cutting blades 2, preferably in the form of discs, carried on a shaft 20 disposed substantially parallel to the axis of the drum. This cutter shaft 20 extends laterally beyond either side of the drum and housing and is supported at its ends in suitable bearings 20a carried by arms 21 and 22. The arm 21 is rotatably supported on one end of shaft 9 while arm 22 has a circular projection 22a rotatably supported in a suitable opening 23 in housing 11 and about the bearing 24 for the end of shaft 9. A ring 23a having suitable fastening means, retains the projection 22a of arm 22 in opening 23. At their other ends these arms 21 and 22 are carried by adjustable links 25 which are connected to crank arms 27 secured to a cross shaft 28 rotatably mounted in the housing 11 and at one end thereof, as more clearly shown in Fig. 2. Movement of the handle 30 in one direction is transmitted through the levers and rods 30a to the shaft 28, crank 29 and cutter shaft 20 and acts to move the cutter shaft and cutters away from the inner surface of the drum. Corresponding movement of the handle in the opposite direction brings the cutters toward the inner surface of the drum. Adjustable stops 31 are carried by the housing 11 to afford a rest for the arms 21 and 22. These stops, by limiting the movement of the cutter-shaft-carrying-arms 21 and 22, serve to determine the amount of space to be maintained between the cutters and the inner surface of the drum.

The cutters 2 illustrated consist of thin metal discs having sharp edges 32, the center of the disc being perforated to slide over the cutter shaft 20. Each blade has disposed on either side thereof a filler block 33 which is preferably keyed to the shaft to prevent rotation thereof relative to the shaft. Lock nuts 34 engaging the filler blocks at opposite ends of the cutting device secure the discs and filler blocks with any desired degree of frictional engagement but preferably are so adjusted that the cutters normally rotate with the shaft 20 but any cutter may cease rotating if it encounters any obstacle which would be likely to break the cutter if it could not stop.

The cutter shaft is rotated by a series of gears housed within one of the cutter shaft carrying arms 22. This gearing, as shown, comprises a bevel gear 35 fixed to one end of drum drive shaft 9 which meshes with another bevel gear 36 secured to a shaft 37 extending lengthwise within the arm 22 and carrying at its opposite end a similar bevel gear 38 which in turn meshes with a fourth bevel gear 39 keyed to the cutter shaft 20 against rotation relative thereto but in a manner to permit movement of the cutter shaft lengthwise therethrough. Rotation of the drum drive shaft 9 is in this manner transmitted to the cutter drive shaft and the cutters and drum are thus rotated simultaneously and with any desired predetermined ratio of speeds.

It is desirable that the cutter shaft be mounted for movement transversely of the drum, and to accomplish this purpose in one preferred way, means have been provided for moving the cutter shaft with its cutters back and forth across the drum while the cutters are rotating and preferably while the drum also is rotating. It will be understood that although the cutter shaft may be moved transversely of the drum, whether the drum is rotating or not and whether the cutters are rotating or not, very desirable results are obtained when these parts are all in motion simultaneously.

Means for actuating cutter shaft and cutters transversely of the drum is also housed within the cutter shaft and carrying arm 22. This means, as shown, comprises a worm gear 40 adjustably mounted in the arm 22 and disposed to engage with a worm 41 keyed to the drive shaft 9. This gear has a hub 40a which has a sliding fit in a boss 22b of the arm 22 and has its extending end threaded to receive a lock nut 42 extending through the hub. Extending through hub 40a is a stud 43 which has attached to its inner end a cone-shaped friction member 44 which may fit within the gear 40 which is recessed to receive it and thereby rotate friction member 44 when desired. This member 44 carries an eccentrically mounted pin 45 equipped with a roller 46 which engages within the forked end 47 of the arm 48 which is rotatably supported near its center by a stud 49 removably held in one of the several openings 50 in the side of the cutter shaft carrying arm 22. Attached to the outer end of stud 43 which is threaded, is a nut 51 by means of which the friction member 44 may be manually moved into or out of contact with the worm gear 40 by sliding stud 43 within the hub 40a. By this means motion may be transmitted to the arm 48 when desired. The other end of the arm 48 is provided with a roller 52 which fits between substantially parallel surfaces of a turned down shoulder of cutter shaft 20, and a member 53 secured to the adjacent end of the cutter shaft 20. It will be noted by referring to Figs. 3 and 4 that the bevel gear 39 on the cutter shaft 20 is keyed thereto by key pins 54 having roller surfaces 55 to permit the shaft 20 to move freely through the bevel gear 39 in response to the movement of the arm 48.

Rotation of the shaft 9 and worm 41 attached thereto rotates the worm gear 40 and when friction member 44 is forced into contact with this gear causes the eccentrically mounted pin 45 and its roller 46 to oscillate the lever 48 back and forth about its pivot 49 and coincident therewith to reciprocate the cutter shaft 20 lengthwise of itself.

Near the top and preferably on about the vertical center line of the drum housing, means are suspended for receiving material discharged from the drum. As shown, this means comprises a chute 56 open at the inner and top end and at the outer end. A scraper 57 or other suitable means is provided on a rod 58 which is rotatably carried by the drum housing 13 so that upon rotation of a handle 59 connected therewith, the scraper may be brought into substantial contact with the inner surfaces of the drum to scrape or remove therefrom the material carried by the drum and to discharge the same into the chute 56. It will be understood that the chute should be sufficiently large to hold the normal content of the drum, since the scraper serves to remove all of the material from the drum in one rotation of the drum.

It may be desirable to provide additional means for more thoroughly, intimately and uniformly mixing the contents of the drum. Such means as shown briefly in Fig. 1 consists of a shaft 60 rotatably mounted on the drum housing 13 which carries a skeleton frame 61 one side of which may be brought into engagement with the inner surface of the drum. This agitating device is actuated by movement of a handle 62 connected to the shaft 60 and may be operated at any time either during the cutting operation or subsequent thereto. For a more detailed description of this mixing device reference is made to the previously cited application of Napier.

Figure 5:
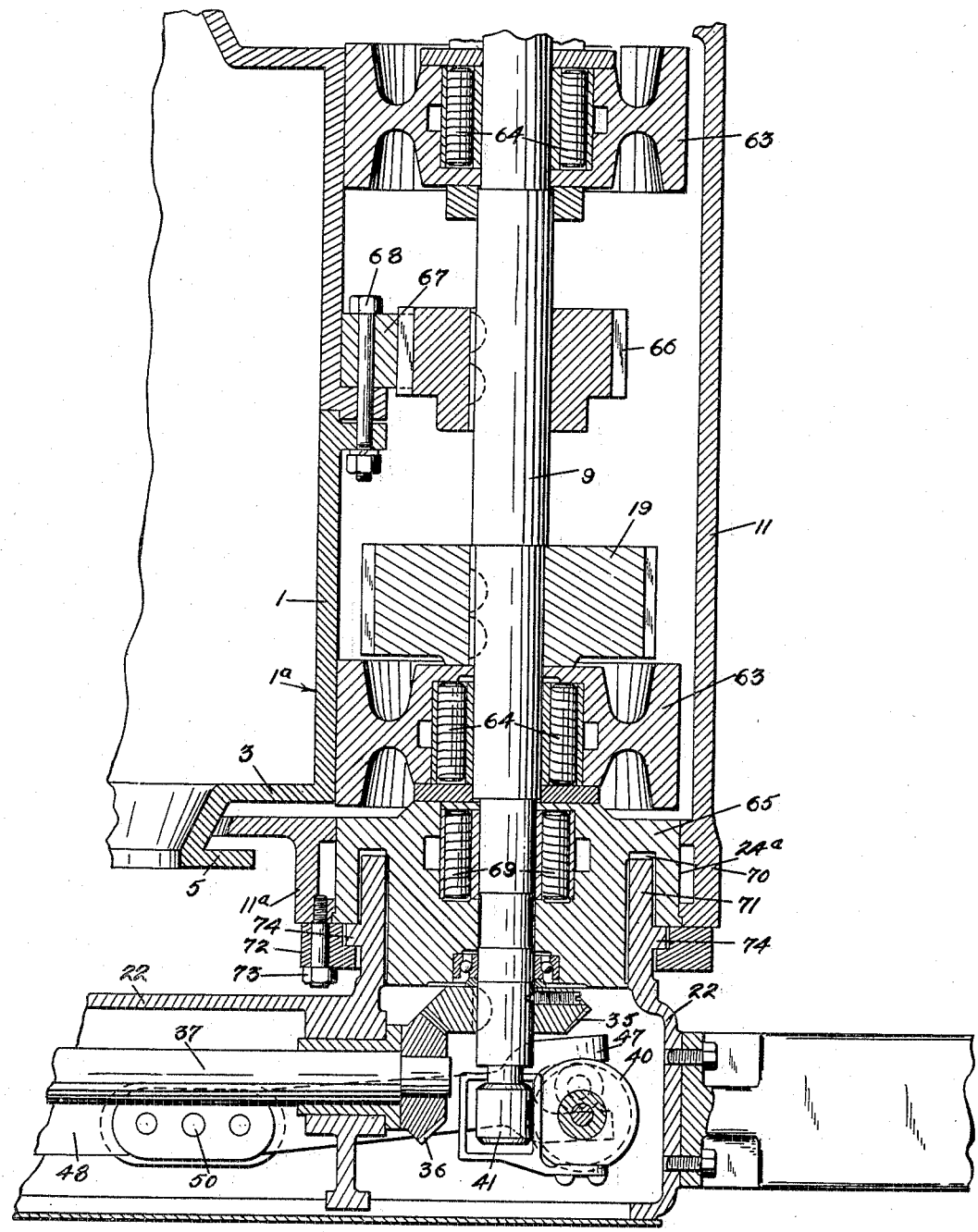
Fig. 5 is a sectional view of a modified form of apparatus embodying my invention.

In the modification shown by Fig. 5 the drum 1 is supported by plane-surfaced rollers 63, which are supported on bearings 64 on each end of the shafts 9 and 10 which shafts extend substantially parallel to the axis of rotation of the drum and are each rotatably carried by the drum housing. One end of shaft 9 is carried in bearing 65. The drum 1 is rotated from the drive shaft 9 by means of a gear 66 attached to the shaft and meshing with a rack 67 attached to the drum, as by bolts 68.

Arm 22 is supported by the bearing 65 instead of directly by the housing 11 as previously described. The bearing 65 is supported by and fits directly into the housing 11a and has anti-friction means 69 to allow rotation of the drive shaft 9. The bearing 65 has a recessed circular opening 70 within which fits a circular projection 71 formed integral with the arm 22. Attached to the housing 11 by fastening means 73 is a member 72 which retains the extension 74 on the projection 71, the function of member 72 being to retain the projection 71 within the recessed opening 70.

Having thus described my invention so that those skilled in the art may be enabled to practice the same, what I desire to secure by Letters Patent is defined by what is claimed.

What I claim is:

1. In combination, a rotatable driven shaft, a cutter shaft rotated thereby and a manually controllable pivoted member cooperating with the driven shaft and the cutter shaft for optionally reciprocating the cutter shaft axially thereof.

2. In combination, a driven shaft, a cutter shaft, means for rotating the cutter shaft by the driven shaft, means for reciprocating the cutter shaft, manually controllable means for transforming rotary movement of the driven shaft into an axially reciprocatory movement of the cutter shaft, said means including a recessed gear and a member frictionally engageable therein.

3. In combination, a rotatable driven shaft, a rotatable cutter shaft having a cutter thereon, a transmission shaft connected by gearing to both the driven shaft and cutter shaft for operating the latter, a pivoted member having a forked end, a rotatable friction member manually operable from the driven shaft and having a pin located thereon eccentrically to its axis of rotation and within the forked end for imparting an oscillating motion to said pivoted member, which in turn reciprocates the cutter shaft.

4. In combination, a rotatable driven shaft, a rotatable cutter shaft with cutter thereon, a rotatable transmission shaft connected to the driven shaft and cutter shaft, a recessed member geared to the driven shaft, a stud passing through said recessed member, a friction member receivable by said recessed member, an eccentrically mounted pin thereon, a roller mounted on said pin, a member pivoted intermediate its ends of which one is forked and engageable with said mounted roller and being oscillatable, the other end operable to reciprocate the cutter shaft.

5. In combination, a rotatable driven shaft, a rotatable cutter shaft having a cutter thereon, an intermediate rotatable shaft for transmitting motion from the driven shaft to the cutter shaft, a member pivoted intermediate its ends and forked at one end, a rotatable member geared to the driven shaft, a stud passing through said member, a friction member carried on said stud, a pin with roller thereon carried by said friction member and located eccentric to said stud and within the forked end member, means whereby the friction member may be brought into contact with the rotatable geared member thus causing said friction member to rotate and cause the pin and roller carried thereon to oscillate said pivoted member which in turn reciprocates the cutter shaft.

6. A cutting machine comprising in combination, a housing, a drum rotatably mounted within the housing, a cutter shaft extending through the drum and carrying cutting means, rotatable arms for supporting the cutter shaft, one of said arms being hollow, a driven shaft for rotating the drum and cutter shaft and means within the hollow arm operatively connecting the driven and cutter shafts for rotating the latter.

7. A cutting machine comprising in combination, a housing, a drum rotatably mounted within the housing, a cutter shaft extending through the drum and carrying cutting means, pivoted arms for supporting the cutter shaft, one of said arms being hollow, a driven shaft for rotating the drum and cutter shaft and means within the hollow arm operatively connecting the driven and cutter shafts for reciprocating the latter.

8. A cutting machine comprising in combination, a housing, a drum rotatably mounted within the housing, a cutter shaft extending through the drum and carrying cutting means, pivoted arms for supporting the cutter shaft, one of said arms being hollow, a driven shaft for rotating the drum and cutter shaft and means within the hollow arm operatively connecting the driven and cutter shafts for rotating and reciprocating the latter.

9. In combination with a device of the character described, driving means, cutting means, an auxiliary member connected by gearing to both the driving and cutting means to transmit rotary motion of the one to the other, a pivoted member, friction means connecting the driving means to the pivoted member to oscillate the latter, the pivoted member operatively engaging the cutting means to reciprocate axially said cutting means when the pivoted member is oscillated.

10. In combination with a device of the character described, driving means, cutting means, means for transmitting motion from the driving means to the cutting means, a pivoted member operatively associated with the cutting means, a manually controllable friction element connecting the pivoted member to the driving means to oscillate said member and thereby to impart an axial reciprocating motion to the cutting means.

11. In combination, a rotatable driven shaft, a rotatable cutter shaft with a cutter thereon, said shaft having cam surfaces adjacent one end thereof, a rotatable transmission shaft gear-connected to the driven shaft and cutter shaft, a gear attached to the cutter shaft by suitable means which allows transverse movement of said shaft within said gear, a recessed member geared to the driven shaft, a stud passing through said recessed member, a friction member receivable by said recessed member, an eccentrically mounted pin thereon, a roller mounted on said pin, a member pivoted intermediate its ends of which one is forked and engageable with said mounted roller and being oscillatable, a roller attached to the other end of the pivoted member and engageable with said cam surfaces and operable to reciprocate the cutter shaft.

12. In combination, a rotatable driven shaft, a rotatable cutter shaft with a cutter thereon, a rotatable transmission shaft gear-connected to the driven shaft and cutter shaft, a gear suitably attached to the cutter shaft to allow transverse movement of said shaft within said gear, a recessed member geared to the driven shaft, a friction member frictionally engageable therewith, means for engaging and disengaging the said member, an eccentrically mounted pin on the said friction member, a roller mounted on said pin, a lever pivoted intermediate its ends of which one end is forked and engageable with said mounted roller and being oscillatable thereby, the other end engageable with the cutter shaft and operable to reciprocate the cutter shaft.

13. In combination with a housing, a drum mounted within the housing for rotation about a fixed horizontal axis, a fixed axis cutter-carrying shaft within the drum, and means partly housed within the housing for moving the shaft toward and away from the inner surface of the drum.

14. In combination with a housing, a drum mounted within the housing for rotation about a fixed horizontal axis, a fixed axis cutter carrying shaft within the drum, and means partly housed by the housing and operable while the shaft is rotating for moving the shaft toward and away from the inner surface of the drum.

15. In a cutter, the combination of a housing, a drum rotatably mounted in the housing, a cutter shaft within the drum, an arm pivoted to said housing and supporting said cutter shaft, and means for rotating said cutter shaft housed within said arm.

16. In a cutting machine, the combination of a housing, a drum rotatably mounted in the housing, a cutter shaft within the drum, an arm pivoted to said housing and supporting said cutter shaft, a driving shaft projecting into said arm, a driven shaft housed within said arm and arranged to transmit rotation of said driving shaft to said cutter shaft.

17. In a cutting machine the combination of a housing, a drum rotatably mounted in the housing, a cutter shaft within the drum, an arm pivoted to said housing and supporting said cutter shaft, means within said arm for rotating said cutter shaft, and other means within said arm driven by said first named means for axially reciprocating said cutter shaft.

In testimony whereof I hereunto affix my signature this 2nd day of February, 1926.

EDWARD P. BURRELL.